United States Patent [19]

Eng, Jr.

[11] Patent Number: 4,847,547

[45] Date of Patent: Jul. 11, 1989

[54] BATTERY CHARGER WITH VBE TEMPERATURE COMPENSATION CIRCUIT

[75] Inventor: Benjamin Eng, Jr., Everett, Wash.

[73] Assignee: John Fluke Mfg., Co. Inc., Everett, Wash.

[21] Appl. No.: 222,009

[22] Filed: Jul. 21, 1988

[51] Int. Cl.$^4$ ............... H02J 7/10; G05F 1/58
[52] U.S. Cl. .................... 320/35; 323/907
[58] Field of Search ........... 320/35, 36; 323/907, 323/315

[56] References Cited

U.S. PATENT DOCUMENTS

| | | | |
|---|---|---|---|
| 3,553,565 | 1/1971 | Ebbinge et al. | 320/35 X |
| 3,919,616 | 11/1975 | Allison | 320/35 |
| 3,967,186 | 6/1976 | Adams | 320/35 X |
| 4,250,445 | 2/1981 | Brokaw | 323/907 X |
| 4,313,083 | 1/1982 | Gilbert et al. | 323/907 X |
| 4,315,209 | 2/1982 | Schmoock | 323/907 X |

*Primary Examiner*—R. J. Hickey
*Attorney, Agent, or Firm*—Michael J. Strauss; Stephen A. Becker; Mikio Ishimaru

[57] ABSTRACT

A battery charger supplies to a battery an output voltage having a desired temperature coefficient of voltage. The charger includes an operational amplifier having a summing junction to which a reference current and a feedback signal derived from the amplifier output are supplied. The $V_{be}$ multiplier circuit includes a bipolar transistor which is biased into its active region so that the charging voltage supplied by the amplifier is temperature corrected in accordance with a negative coefficient of voltage characteristic of the transistor.

6 Claims, 2 Drawing Sheets

BATTERY CHARGER WITH VBE TEMPERATURE COMPENSATION CIRCUIT

TECHNICAL FIELD

This invention is related generally to battery chargers, and more particularly, toward an improved battery charger for use with batteries requiring a temperature compensated charging voltage.

BACKGROUND ART

Many electrical and electronic devices utilize rechargeable or "secondary" batteries as power sources. One type of rechargeable battery, comprising nickel-cadmium electrodes or "NiCad" type battery, is used as a source of portable or alternate power in environments requiring a sealed battery and where battery maintenance must be minimized. While NiCad batteries are relatively expensive, a relatively simple constant current supply is used for charging and recharging.

In heavy current demand applications where battery size and cost must be minimized, lead-acid batteries are often used. Improvements in construction, including the capability to make a sealed lead-acid battery, have made possible the use of lead-acid batteries in low maintenance environments and in equipment having relatively low current demands. Technical information on sealed lead-acid batteries is available in publications such as *The Sealed Lead Battery Handbook* published by the General Electric Corporation. In comparison to NiCad batteries, lead-acid batteries are more economical at an equivalent energy level.

To maintain a lead-acid battery fully charged, a voltage source is connected to the battery to supply a "float" or "trickle" charge. FIG. 1 is a schematic diagram of a simplified battery charger 10 for a lead-acid battery. Voltage reference 12 is connected to an inverting input of operational amplifier 18 through input resistor 14. The noninverting input of operational amplifier 18 is connected to the positive terminal of voltage reference 12 through ground. An output of operational amplifier 18 is connected to lead-acid battery 20, supplying a charging voltage to the battery. Feedback resistor 16 provides a negative feedback signal from the output back to the inverting input terminal of operational amplifier 18 to regulate and stabilize the output voltage of the amplifier.

The voltage gain of operational amplifier 18 as shown in FIG. 1 is equal to the resistance value of feedback resistor 16 divided by the resistance value of input resistance 14. Thus, the charging voltage to battery 20 output by operational amplifier 18 is equal to the input voltage supplied by voltage reference 12 multiplied by the voltage gain of the amplifier, expressed as:

$$V_{out} = -(R_f/R_i)V_{in} \quad (1)$$

where voltage reference 12 is $V_{in}$, input resistor 14 is $R_i$ and feedback resistor 16 is $R_f$. For example, if voltage reference 12 is at 5 volts, input resistor 14 has a value of 10K ohms, and feedback resistor 16 has a value of 20K ohms, the voltage gain of operational amplifier 18 is equal to 2 (20K/10K), resulting in an output voltage of 10 volts being supplied to battery 20, as follows:

$$V_{out} = -(20K/10K)(-5V) \quad (2)$$

A problem with lead-acid batteries is caused by an increase in chemical reactivity as the temperature of the battery increases; the reactivity doubles approximately every 10 degrees Celsius. As the temperature of the battery increases, the internal resistance decreases so that the battery accepts a larger charging current at a given charging voltage. The increased current flow generates additional heating of the battery, further reducing its internal resistance. This cycle of battery heating followed by an increase in battery charging current results in a run-away condition which can damage the battery and cause it to fail. Therefore, to avoid this problem, it is necessary provide temperature compensation in a lead-acid battery charger to avoid overcharging and thermal run-away of the battery. Accordingly, to achieve a reliable and long life battery/charger system using sealed lead-acid batteries, the float or trickle voltage of the battery charger should be corrected for ambient battery temperature by decreasing the charging or float voltage as temperature increases.

The range of compensation for a lead-acid battery in terms of voltage with respect to temperature is typically from $-2.5$ millivolts per degree Celsius per cell (mv/deg. C/cell) to $-7$ mv/deg. C/cell, depending on cell temperature and the desired overcharge rate.

Prior art battery chargers have accomplished voltage temperature compensation using one of two techniques. The battery charger circuit shown in FIG. 2 illustrates one such charger circuit with a negative coefficient thermistor 34 in the negative feedback loop of operational amplifier 18. Resistors 36 and 38 are chosen to provide the desired total feedback resistance in combination with negative temperature coefficient thermistor 34 to produce a desired amplifier voltage gain. As thermistor 34 is subjected to higher ambient temperature, its resistance value decreases, thereby resulting in a lower total feedback loop resistance value. This causes the voltage gain of amplifier 18 to decrease so that the voltage supplied to lead-acid battery 20 is proportionally reduced.

While the circuit of FIG. 2 results in a negative charging voltage-temperature coefficient, thereby protecting lead-acid battery 20, it has the disadvantage of requiring the use of a relatively expensive thermistor in the compensation network. Further, because suitable thermistors are available in limited ranges of resistance values and having limited values of temperature coefficients, it is necessary to change or adjust several charger components to obtain a desired charger voltage-temperature coefficient.

A second prior art temperature compensation technique, is shown schematically in FIG. 3, provides a reference voltage source having a negative temperature coefficient, with voltage source 12, resistor 40 and transistor 42 comprising a temperature compensated voltage reference source. Because the base-to-emitter voltage ($V_{be}$) of transistor 42 exhibits a negative voltage-temperature coefficient, the input reference voltage to operational amplifier 18 varies accordingly. However, silicon transistors exhibit a limited range of temperature induced characteristics, having a typical $V_{be}$ value in the range of 0.6 volt and with a temperature coefficient of approximately $-2.2$ mV/deg. C. Therefore, amplifier gain must be adjusted to obtain a desired charger voltage-temperature compensation. Further, many commercially available voltage regulator circuits include a self-contained voltage reference source connected directly to an associated operational amplifier in a single integrated circuit package. For example, the National Semiconductor LM1578 series of switching regulators include a fixed internal voltage reference which is inaccessible externally from the integrated circuit package. Thus, it is not possible to provide either a different voltage reference source or temperature compensation circuitry for the on-chip voltage source.

A need therefore exists for a charger having a negative charging voltage-temperature coefficient for lead acid batteries.

A need further exists for a temperature compensated battery charger without using expensive components to provide a negative temperature coefficient of charging voltage.

A need further exists for a temperature compensated battery charger which can readily be adapted to accommodate different battery voltages and voltage-temperature coefficients.

A need further exist for voltage-temperature compensation in battery chargers using conventional voltage reference sources.

A need further exists for a voltage-temperature compensated battery charger using a minimum number of components to provide a negative voltage-temperature coefficient of charging voltage.

Accordingly, an object of the invention is to provide a temperature compensated charger for use with batteries which is readily adaptable for use with various battery charging voltages and voltage-temperature coefficients using a conventional voltage reference source.

Another object of the invention is to provide a temperature compensated charger for use with batteries using inexpensive and readily available components.

DISCLOSURE OF INVENTION

In accordance with one aspect of the invention, a battery charger for supplying an output voltage having a desired temperature coefficient of voltage includes an operational amplifier having a summing junction and an output connected to supply a charging potential to a battery. A reference current generator supplies a reference current to the summing junction and a $V_{be}$ multiplier circuit is connected between the output and the summing junction of the operational amplifier. The $V_{be}$ multiplier includes a bipolar transistor and means for biasing the bipolar transistor into an active region whereby the charging voltage supplied by the amplifier is temperature compensated in accordance with a negative temperature coefficient of voltage operating characteristic of the bipolar transistor.

In accordance with another aspect of the invention, a feedback resistor ($R_F$) is connected in series with the $V_{be}$ multiplier circuit and the reference current supply includes a voltage source in series with a resistor.

In accordance with another aspect of the invention, the biasing means includes a base-to-collector resistor ($R_c$) connected between the base and collector of the transistor as well as a base-to-emitter resistor ($R_e$) connected between the base and emitter of the transistor. The base-to-collector resistor has a value of resistance substantially equal to the resistance of the base-to-emitter resistor ($R_e$) multiplied by a difference between a desired voltage-temperature coefficient and the transistor voltage-temperature coefficient divided by the voltage-temperature coefficient of the transistor.

In accordance with another aspect of the invention, a power supply has an output voltage having a desired temperature coefficient (TC) and includes a voltage regulator having an input terminal and an output connected to supply a charging voltage to a battery. A reference voltage source is connected to the voltage regulator input and a base-to-emitter voltage ($V_{be}$) multiplier circuit is connected between the voltage regulator input and the output of the voltage regulator. The $V_{be}$ multiplier circuit includes a bipolar transistor and transistor biasing means whereby the charging voltage supplied by the voltage regulator is temperature compensated in accordance with a negative voltage-temperature coefficient operating characteristic of the transistor.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR PRACTICING THE INVENTION

The Ebers-Moll equation for solid-state devices describes the relationship between the collector current and $V_{be}$ of a transistor as follows:

$$V_{be} = \frac{kT}{q} \ln\left(\frac{I_c}{I_s} + 1\right) \quad (3)$$

where q is the electron charge ($1.60 \times 10^{-19}$ coulombs), k is Boltzmann's constant ($1.38 \times 10^{-23}$ joules/°K.), T is the absolute temperature in degrees Kelvin (°K.×°C.+273.16), and $I_s$ is the saturation current of the particular transistor which also depends on T. Because of the temperature dependence of $I_s$, $V_{be}$ decreases at the rate of approximately 2.2 mV/°C. so that $V_{be}$ is inversely related to temperature. Since $I_c = h_{FE}I_B$, the collector current is proportional to the base current, resulting in a multiplication of the value of $V_{be}$. Thus the current amplification characteristic of the transistor is used in a $V_{be}$ multiplier circuit to obtain a desired temperature dependent output. In a $V_{be}$ multiplier circuit, a transistor is biased to obtain a desired collector current. As the temperature of the transistor increases, $V_{be}$ decreases, resulting in a corresponding decrease in collector current.

$V_{be}$ multiplier circuits have been used in audio amplifiers to provide proper bias of the output transistors under various operating temperatures. The $V_{be}$ multiplier circuit is used in the amplifier bias circuit so that the quiescent collector current of the output transistors remains constant, minimizing dissipation of the output transistors. However, the principle employed in a $V_{be}$ multiplier has not before been used in a battery charger to adjust and correct a charging voltage to compensate for battery temperature.

Figure 4:
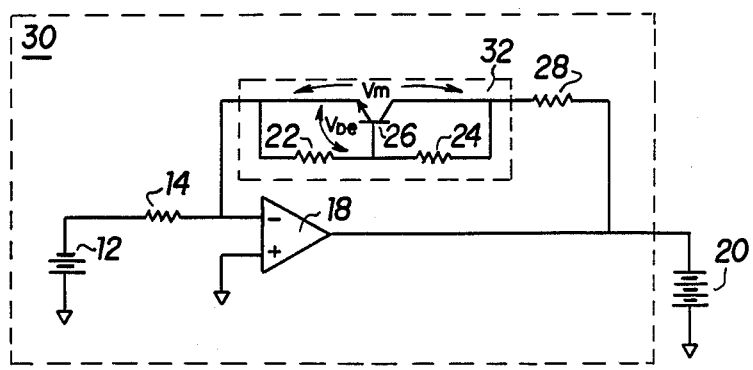
FIG. 4 is a battery charger of the invention.

In accordance with the invention, and as shown in FIG. 4, a battery charger 30, implementing $V_{be}$ multiplication to supply a temperature compensated charging voltage, comprises an operational amplifier 18 having a summing junction and an output connected to supply a charging potential therefrom to the battery. A reference current source, including voltage reference 12 and series resistor 14, is connected to the summing junction of operational amplifier 18. $V_{be}$ multiplier 32 is connected between the output and the summing junction of operational amplifier 16 and includes a bipolar transistor 26. Emitter resistor 22 and collector resistor 24 form a voltage divider to bias transistor 32 into an active region so that the charging voltage supplied by operational amplifier 18 is temperature compensated in accordance with a negative temperature coefficient of voltage operating characteristic of transistor 18.

Figure 1:
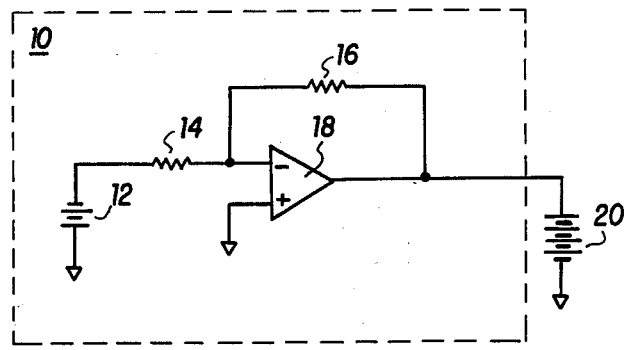
FIG. 1 is a schematic diagram of regulated battery charger of the prior art.
Figure 2:
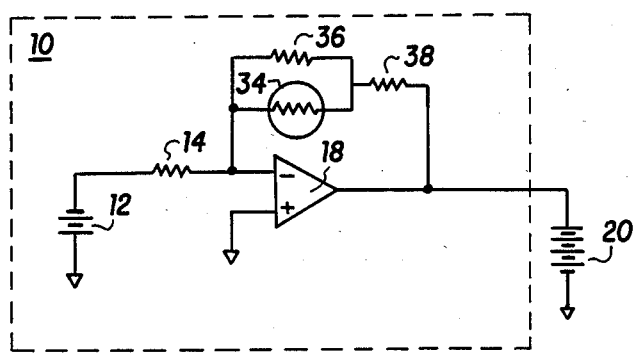
FIG. 2 is a first temperature compensated battery charger of the prior art.
Figure 3:
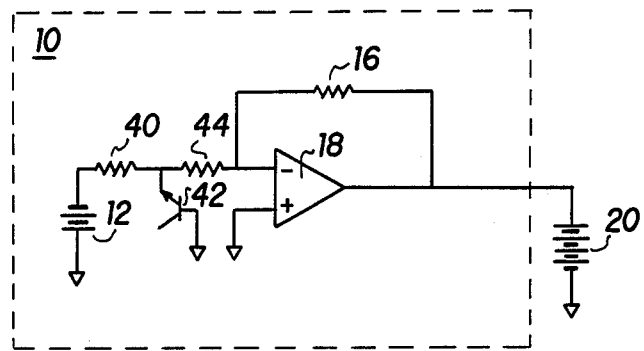
FIG. 3 is a second temperature compensated battery charger of the prior art.

As in charger 10 of FIG. 1, operational amplifier 18 has an inverting input terminal forming a summing junction to which are applied reference and feedback current in the usual manner. However, the amount of feedback current from the output of operational amplifier 18 of battery charger 30 is regulated by a feedback resistor 28 in series with $V_{be}$ multiplier circuit 32. The voltage across $V_{be}$ multiplier ($V_m$) decreases as the temperature of transistor 26 increases, resulting in a lower effective total feedback resistance. Because the voltage gain of operational amplifier 18 is directly proportional to the total effective feedback resistance, the output voltage of battery charger 30 supplied to battery 20 displays a negative voltage-temperature coefficient.

Transistor 26 is biased by resistors 22 and 24 to operate in an active region so that $V_m$ is proportional to the $V_{be}$ of transistor 26. Because the base-to-emitter voltage, or $V_{be}$, of transistor 26 has a negative temperature coefficient of voltage, $V_m$ displays an amplified negative temperature coefficient of voltage characteristic as follows:

$$V_m = \frac{R_e + R_c}{R_e} V_{be} \quad (4)$$

where emitter resistor 22 corresponds to $R_e$ and collector resistor 24 corresponds to $R_c$. This ratio is adjusted to obtain a desired voltage-temperature coefficient ($TC_m$) where $V_{be}$ exhibits a known voltage-temperature coefficient ($TC_{Vbe}$), typically in the range of $-2.2$ mV/deg. C. Therefore, a desired $TC_m$ is given by:

$$TC_m = \frac{V_m}{V_{be}} TC_{Vbe} \quad (5)$$

From equations 4 and 5, the value of emitter resistor 22 can be expressed as a function of the value of collector resistor 24, the transistor voltage-temperature coefficient, and the desired voltage-temperature coefficient, as follows:

$$R_c = \frac{(TC_m - TC_{Vbe})}{TC_{Vbe}} R_e \quad (6)$$

Once $V_m$ is determined, the value of feedback resistor 28 can be calculated. The voltage across feedback resistor 28 is equal to $V_{out}$ minus $V_m$, while the current passing through feedback resistor 28 is substantially equal to the current through input resistor 14. Thus:

$$R_f = \frac{(V_{out} - V_m)}{V_{in}} R_i \quad (7)$$

$$R_f = \frac{(V_{out} - V_m)}{V_{in}} R_i \quad (7)$$

where feedback resistor 28 corresponds to $R_f$, input resistor 14 corresponds to $R_{in}$ and reference source 12 corresponds to $V_{in}$.

For example, if a battery charger using a $V_{be}$ multiplier circuit as shown in FIG. 4 is required to have a voltage-temperature coefficient of $-5$ mV/deg. C. ($TC_m$), using a silicon transistor having a $V_{be}$ of 0.6 volt and a negative voltage-temperature coefficient ($T_{Vbe}$) of 2.2 mV/deg C., this results in $TC_m/T_{Vbe}$ having a voltage-temperature coefficient that is 2.27 times that of $V_{be}$. Therefore:

$$V_m = \frac{TC_m}{T_{Vbe}} V_{be} = 1.362 \, V \quad (8)$$

$R_e$ is chosen to be sufficiently large so as to cause most of the current flowing through the feedback path to pass through transistor 26. Given a value of $R_e$ of 15K. ohms, $R_c$ is calculated as:

$$Rc = \frac{V_m - V_{be}}{V_{be}} R_e = 19.05k \text{ ohms} \quad (9)$$

Finally, $R_f$ is calculated as:

$$R_f = \frac{(V_{out} - V_m)}{V_{in}} R_i = 17.28k \text{ ohms}. \quad (10)$$

When determining an appropriate $TC_m$, other components which may be in series with the battery should be taken into consideration. For example, if switching diodes having a negative voltage-temperature coefficient are placed in series with the battery, these values should be added to the $TC_m$ due to the battery alone. Therefore, if a negative voltage-temperature coefficient at the battery of $-10$ mV/deg. C. is required, and two switching diodes are included in the charging current path, each having a TC of $-2.2$ mV/deg. C., then the total of $-14.4$ mV/deg. C. represents the required $TC_m$.

The battery charger of this invention can be used in other applications requiring an electrical signal including temperature compensation. Further, the charger according to the invention uses only three additional parts inserted in series with a regulator feedback loop; a transistor and two biasing resistors, which are inexpensive and readily available. Therefore the cost of the $V_{be}$ multiplier compensation circuit is approximately one-fifth as much as that of an equivalent thermistor device. Additionally, unlike prior regulators using a variable voltage reference, the $V_{be}$ temperature compensation circuit accommodates voltage regulators having fixed internal reference voltage sources.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, while the output of the operational amplifier is shown directly connected to supply a charging voltage to a battery, further voltage amplifier circuitry may be included to increase the voltage or current output of the charger.

I claim:

1. A battery charger for supplying to a battery an output voltage having a desired temperature coefficient of voltage, comprising:

an operational amplifier having a summing junction and an output connected to supply a charging potential therefrom to the battery;

means for supplying a reference current to said summing junction; and $V_{be}$ multiplier means connected between the output and the summing junction of said operational amplifier, said $V_{be}$ multiplier means including a bipolar transistor and means for biasing said bipolar transistor into an active region thereof whereby the charging voltage supplied by said amplifier is temperature compensated in accordance with a negative temperature coefficient of voltage operating characteristic of said bipolar transistor.

2. A battery charger as recited in claim 1, further comprising a feedback resistor ($R_F$) in series with said $V_{be}$ multiplier circuit and wherein said means for supplying a reference current comprises a voltage source in series with a resistor.

3. A battery charger as recited in claim 2, wherein said biasing means includes a base-to-collector resistor ($R_c$) connected between a base and a collector terminal of said bipolar transistor and a base-to-emitter resistor ($R_e$) connected between said base terminal and an emitter terminal of said bipolar transistor, said base-to-collector resistor having a value of resistance substantially equal to a resistance value of said base-to-emitter resistor ($R_e$) multiplied by a difference between said desired voltage-temperature coefficient and said transistor voltage-temperature coefficient divided by a voltage-temperature coefficient of said transistor.

4. A charger circuit for supplying to a battery an output voltage having a desired temperature coefficient (TC), comprising:

a voltage regulator having an input terminal and having an output connected to supply a charging voltage to the battery;

a source of reference voltage connected to said voltage regulator input; and a base-to-emitter voltage ($V_{be}$) multiplier circuit connected between said voltage regulator input and the output of said voltage regulator, said $V_{be}$ multiplier circuit including a bipolar transistor and transistor biasing means in circuit with said transistor for operating said transistor in an active region thereof whereby the charging voltage supplied by said voltage regulator is temperature compensated in accordance with a negative voltage-temperature coefficient operating characteristic of said transistor.

5. A power supply as recited in claim 4, further comprising a feedback resistor ($R_F$) in series with said $V_{be}$ multiplier circuit and an input resistor ($R_i$) connected between said source of reference voltage and said first voltage regulator input.

6. A power supply as recited in claim 5, wherein a resistance value of said base-to-collector resistor ($R_c$) is substantially equal to a resistance value of said base-to-emitter resistor ($R_e$) divided by a temperature coefficient of said transistor and multiplied by a difference between said desired temperature coefficient and said transistor temperature coefficient.

* * * * *